(12) United States Patent
Hall et al.

(10) Patent No.: US 7,729,254 B2
(45) Date of Patent: Jun. 1, 2010

(54) PARASITIC TIME SYNCHRONIZATION FOR A CENTRALIZED COMMUNICATIONS GUARDIAN

(75) Inventors: Brendan Hall, Eden Prairie, MN (US); Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1594 days.

(21) Appl. No.: 10/993,221

(22) Filed: Nov. 19, 2004

(65) Prior Publication Data

US 2005/0128950 A1    Jun. 16, 2005

Related U.S. Application Data

(60) Provisional application No. 60/523,783, filed on Nov. 19, 2003, provisional application No. 60/523,896, filed on Nov. 19, 2003, provisional application No. 60/523,785, filed on Nov. 19, 2003.

(51) Int. Cl.
*G01R 31/08* (2006.01)

(52) U.S. Cl. ...................................... 370/235

(58) Field of Classification Search ................. 370/235, 370/229, 230, 236, 336, 442, 400, 498
See application file for complete search history.

(56) References Cited

U.S. PATENT DOCUMENTS 4,866,606 A    9/1989    Kopetz 5,276,703 A *   1/1994    Budin et al. ................. 375/130
7,254,393 B2 *  8/2007    Marque-Pucheu .......... 455/436
2003/0067873 A1    4/2003    Fuhrmann et al.
2004/0263327 A1 * 12/2004    Hayes et al. ........... 340/539.13

FOREIGN PATENT DOCUMENTS

| WO | WO 01/13230 A1 | 2/2001 |
| WO | WO 02/31656 A2 | 4/2002 |
| WO | WO 02/099643 A2 | 12/2002 |
| WO | WO 03/069843 A2 | 8/2003 |

\* cited by examiner

*Primary Examiner*—Kwang B Yao
*Assistant Examiner*—Anh Ngoc Nguyen
(74) *Attorney, Agent, or Firm*—Fogg & Powers LLC

(57) ABSTRACT

A parasitic time synchronization network is provided including a plurality of nodes, one or more hubs, each hub having communication links with the plurality of nodes and one or more guardians. Each node is adapted to transmit and receive data and communicate with every other node through the one or more hubs. The communication links between any one hub and the plurality of nodes defines a communication channel. Each guardian is associated with one communication channel. Each node is assigned a time slot in which it is permitted to transmit data through an associated hub of the one or more hubs. A guardian of an associated channel blocks propagation of data transmissions between the plurality of nodes through the associated hub allows only data transmissions from one of the plurality of nodes, wherein the guardian periodically receives a cluster of beacons generated by a plurality of the plurality of nodes.

36 Claims, 5 Drawing Sheets

PARASITIC TIME SYNCHRONIZATION FOR A CENTRALIZED COMMUNICATIONS GUARDIAN

CROSS REFERENCE TO RELATED APPLICATIONS

This application is related to and claims the benefit of the filing date of U.S. Provisional Application No. 60/523,783, entitled "PARASITIC TIME SYNCHRONIZATION FOR A CENTRALIZED TDMA BASED COMMUNICATIONS GUARDIAN" filed on Nov. 19, 2003, and U.S. Provisional Application No. 60/523,896, entitled "VOTING MECHANISM FOR TRANSMISSION SCHEDULE ENFORCEMENT" filed on Nov. 19, 2003, and U.S. Provisional Application No. 60/523,785 entitled "PRIORITY BASED ARBITRATION FOR TDMA SCHEDULE ENFORCEMENT IN A DUAL LINK SYSTEM" filed on Nov. 19, 2003, all of which are incorporated herein by reference.

This application is also related to the following co-pending applications filed on even date herewith, all of which are hereby incorporated herein by reference:

U.S. patent application Ser. No. 10/933,926 (entitled "PRIORITY BASED ARBITRATION FOR TDMA SCHEDULE ENFORCEMENT IN A MULTI-CHANNEL SYSTEM") and which is also referred to here as the '5459 application, and U.S. patent application Ser. No. 10/933,910 (entitled "VOTING MECHANISM FOR TRANSMISSION SCHEDULE ENFORCEMENT") and which is also referred to here as the '5065 application.

TECHNICAL FIELD

The following description relates generally to communication systems and in particular, to distributed fault-tolerant communication systems.

BACKGROUND

Distributed, fault-tolerant communication systems are used, for example, in applications where a failure could possibly result in injury or death to one or more persons. Such applications are referred to here as "safety-critical applications." One example of a safety-critical application is in a system that is used to monitor and manage sensors and actuators included in the fields of automotive, aerospace electronics, industrial control, and the like.

Architectures considered for safety-critical applications are commonly time-triggered architectures where nodes use the synchronized time to coordinate access to common resources, such as the communication bus. One architecture that is commonly considered for use in such safety-critical applications is the Time-Triggered Architecture (TTA). In a TTA system, multiple nodes communicate with one another over two replicated high-speed communication channels using, for example, a time-triggered protocol such as the Time-Triggered Protocol/C (TTP/C).

Fault-tolerant protocols (e.g. TTP/C) that use time-division multiple access (TDMA) as the medium access strategy where each node is permitted to periodically utilize the full transmission capacity of the bus for some fixed amount of time called a TDMA slot. As long as each node uses only its statistically assigned TDMA slot, collision free access the bus can be assured.

Transmissions of messages by nodes in a TDMA network are controlled by a schedule table which determines which node has permission to transmit for each TDMA slot, and also defines the starting time and duration of the TDMA slot. This starting time and duration defines a node's permitted transmission window. A node's transmitter starts to send its message after the start of its window, and should finish before it is over. Nodes without permission to transmit listen for transmissions when a TDMA slot begins until the duration has elapsed. The timing of when a node transmits and receives is controlled by a node's local clock that is synchronized to other nodes in the system, by a distributed clock synchronization algorithm. In practice the perfect synchronization of all of the nodes clocks is not possible so that the clocks for each node are slightly skewed from each other. Because of this, it is possible that a node's transmitter may begin to transmit a message before one or more of the receiving nodes are ready to listen. Similarly, it is possible for a node to continue transmission after the other nodes have stopped listening. Additionally, a degraded node may attempt to transmit well outside of its assigned window.

A centralized guardian has been conceived to limit the propagation of such failures. Guardians (or central guardians) ensure that a degraded node transmitter cannot broadcast to the network outside its allotted window. At the beginning of a TDMA slot, after a predefined delay, the guardian opens a window which allows a node to transmit messages to the network. If the node is operating correctly, it will begin transmission shortly after the guardian's window opens and complete transmission before the window closes. Ideally, receiving nodes (i.e. listening nodes) begin listening at the beginning of the TDMA slot until the guardian's window closes. The guardian blocks transmissions from a node that does not occur within the transmission window.

One problem with the current state of the art for guardians is that in order to achieve the required degree of clock synchronization required to contain SOS faults, realizations of guardian functions have been required to duplicate the protocol logic engine implemented at the nodes. Implementation of the protocol logic engine within the guardian has led to highly complex guardian designs. With the centralization of the guardian's roll in regards to network data flow, guardians themselves have become critical architecture components. The complexity of a guardian design is a significant issue with respect to the market viability of a design in safety critical applications. For example, in some cases gate level failure analysis is required before a guardian design may be used for safety critical applications. In these cases, the complexity of performing a failure analysis for such a guardian has significant financial impact in terms of product development costs. In some applications guardian circuitry may be required to perform self-tests to ascertain its own health. The complexity of these self-tests is also directly related to the complexity of the guardian.

Another problem is that current guardian designs based on internally implementing protocol logic engines requires that guardian within a network be coupled together. Embodiments of the present invention eliminate this requirement.

For the reasons stated above and for other reasons stated below which will become apparent to those skilled in the art upon reading and understanding the specification, there is a need in the art for a simplified guardian design.

SUMMARY

Embodiments of the present invention enable a simple synchronization mechanism to be realized in a central guardian of a TDMA based protocol communication network. In place of full protocol synchronization, embodiments of the present invention enable the central guardian to parasitically steal the time base from a system's member nodes, that themselves are performing a mutual fault tolerant synchronization.

A parasitic time synchronization network is provided including a plurality of nodes, one or more hubs, each hub having communication links with the plurality of nodes and one or more guardians. Each node is adapted to transmit and receive data and communicate with every other node through the one or more hubs. The communication links between any one hub and the plurality of nodes defines a communication channel. Each guardian is associated with one communication channel. Each node is assigned a time slot in which it is permitted to transmit data through an associated hub of the one or more hubs. A guardian of an associated channel blocks propagation of data transmissions between the plurality of nodes through the associated hub allows only data transmissions from one of the plurality of nodes. The guardian periodically receives a cluster of beacons generated by a plurality of the plurality of nodes.

In another embodiment, a network is provided. The network includes one or more hubs and a plurality of nodes. Each node is adapted to communicate with every other node through the one or more hubs. A synchronization function enabled within the network, includes a central guardian and a plurality of clusters of beacons transmitted to the central guardian by a plurality of the plurality of nodes. Based on receipt of one of the plurality of clusters of beacons the central guardian opens a transmission window for one of the plurality of nodes and allows data transmissions from the one of the plurality of nodes to propagate to other nodes.

In yet another embodiment, a method for synchronizing a centralized guardian with a plurality of nodes of a network is provided. The method includes observing receipt of a first beacon, observing receipt of an nth beacon within a predefined time interval t, wherein n is greater than or equal to two. The method further includes concluding that the first beacon, the nth beacon and any beacons observed between the first and nth beacon comprises a cluster of beacons and when the receipt of the nth beacon occurs within the predefined time interval t, defining the receipt of the nth beacon as the beginning of a time slot In still another embodiment a network is provided. The network includes a means for synchronizing a centralized guardian with a plurality of nodes. The network further comprises means for observing receipt of a first beacon and means for observing receipt of an nth beacon within a predefined time interval t, wherein n is greater than or equal to two. The network further comprises means for concluding that the first beacon, the nth beacon and any beacons observed between the first and nth beacon comprises a cluster of beacons; and when the receipt of the nth beacon occurs within the predefined time interval t, defining the receipt of the nth beacon as the beginning of a time slot.

In still another embodiment, a computer-readable medium having computer-executable instructions for performing a method of synchronizing a centralized guardian with a plurality of nodes of a network is provided. The method comprise observing receipt of a first beacon, and observing receipt of an nth beacon within a predefined time interval t, wherein n is greater than or equal to two. The method further includes concluding that the first beacon, the nth beacon and any beacons observed between the first and nth beacon comprises a cluster of beacons and when the receipt of the nth beacon occurs within the predefined time interval t, defining the receipt of the nth beacon as the beginning of a time slot.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention enable a simple synchronization mechanism to be realized in a central guardian of a TDMA based protocol communication network. In place of a full protocol engine within the guardian, embodiments of the present invention enable the central guardian to parasitically steal the time from a system's member nodes, each of which already implement full protocol engines themselves. The method of synchronization presented requires the central guardian to know nothing of the underlying protocol timing used by the network other than the tolerance of synchronization, i.e. time base precision. However, the synchronization precision achieved using the present invention is equivalent to that of guardians executing full protocol aware synchronization. Requiring no specific knowledge of protocol behavior, the method enables very simple synchronization logic to be realized.

This invention differs from previous systems, as it facilitates synchronization of a guardian without duplicating the protocol logic engine of the nodes within the guardian. This has advantages over the current practice including much less complex synchronization implementations and simplified guardian failure analysis for safety critical domains. Additionally, in multiple guardian networks (e.g. safety critical networks with dual redundant communication channels) the present invention allows guardians to remain completely independent from one another and not require guardians to be coupled together, as would be the case with leveraged protocol level synchronization. It will be readily recognized by one skilled in the art upon reading this specification that embodiments of the present invention are applicable to any network implementing a TDMA protocol, including hybrid TDMA protocols that allow time-triggered and asynchronous messages to be shared (e.g. Flex-ray).

Figure 1:
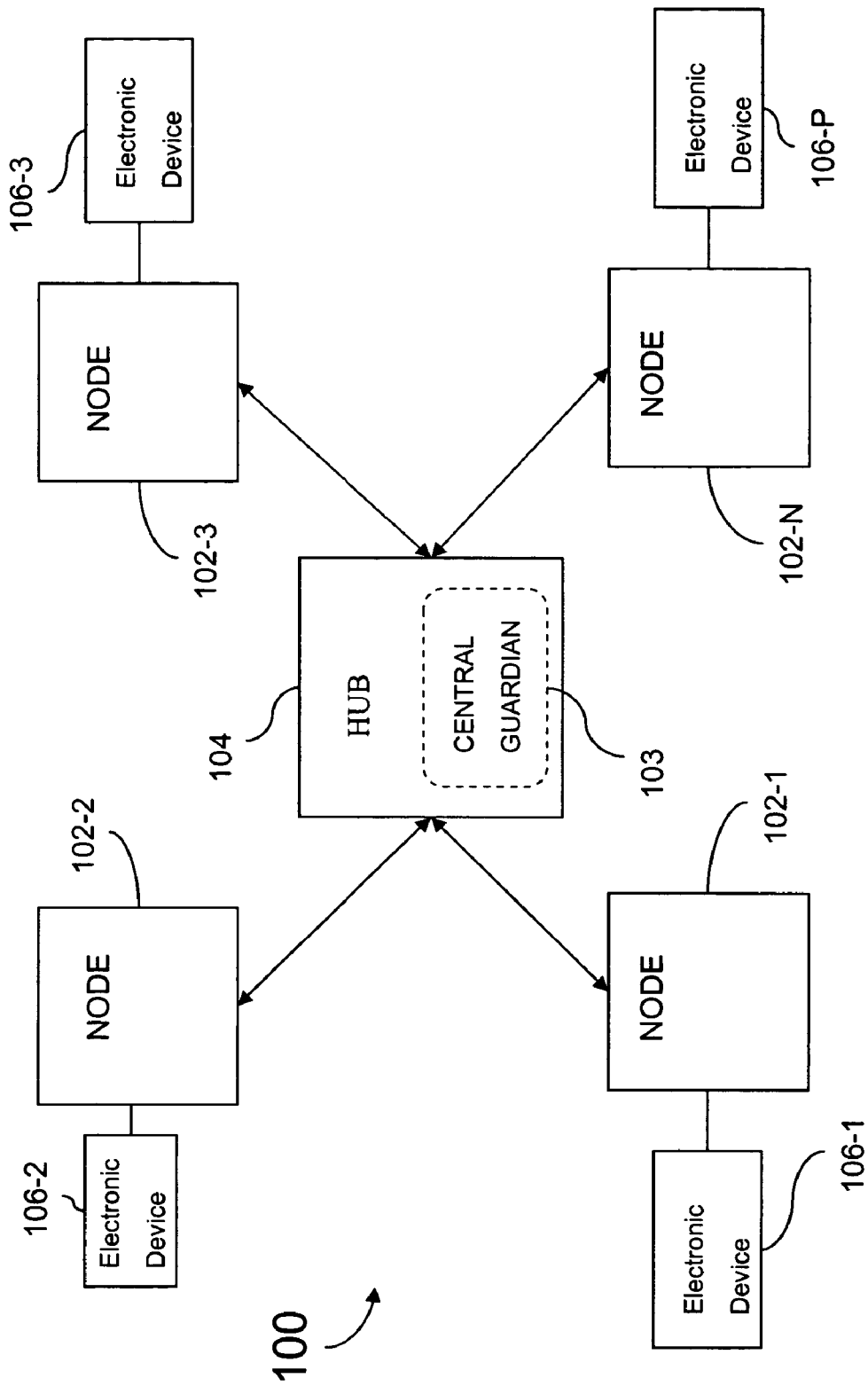
FIG. 1 is a block diagram of one embodiment of a single hub network according to the teachings of the present invention.

FIG. 1 is a block diagram of one embodiment of a single hub based network, shown generally at 100, according to the teachings of the present invention. In this embodiment, network 100 includes a plurality of nodes 102-1 to 102-N each coupled to a hub 104. Data is transmitted in frames from one node 102-1 to 102-N to another in network 100 through hub 104. FIG. 1 illustrates a single hub network for the purposes of clarity. Although multi-channel networks typically comprise two or more hubs, with each node communicating to each hub through independent links, embodiments of the present invention are not limited to only multi-hub or multi-channel networks as would be readily recognized and understood by one in the art upon reading this specification. In one embodiment, network 100 operates on a time division multiple access (TDMA) based communication protocol where each node 102-1 to 102-N has been assigned a transmission slot order (i.e. a SRU slot). Hub 104 includes a central guardian 103 that ensures that a degraded node 102-1 to 102-N transmitter cannot broadcast messages within network 100 outside the allotted window. In one embodiment, one or more electronic devices 106-1 to 106-P are connected to nodes 102-1 to 102-N. In one embodiment, electronic devices 106-1 to 106-P include sensors, processors, actuators, controllers, input devices and the like that communicate data frames over network 100.

Figure 3:
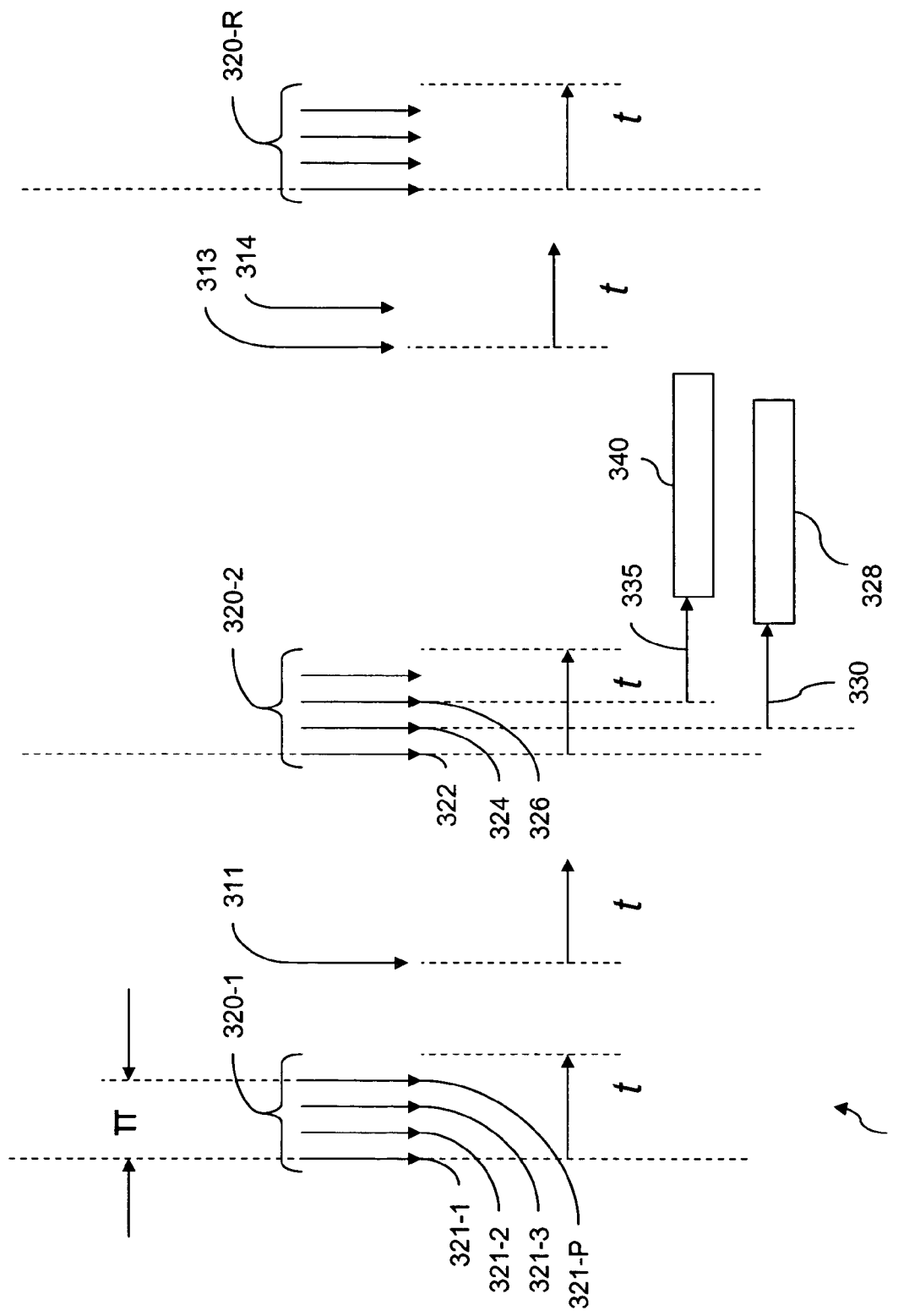
FIG. 3 is an illustration of one embodiment of guardian synchronization for a network such as network 100 described with respect to FIG. 1 or network 200 described with respect to FIG. 2 of the present invention.

In one embodiment, synchronization of guardian 104 within network 100 is achieved as follows: At predefined cyclical points in time, every node 102-1 to 102-N in network 100 transmits a beacon signal (also known as a pulse, or an action time signal in TTP networks), to guardian 104 in accordance with a communication schedule generated by protocol engines within each node 102-1 to 102-N. In one embodiment, a beacon is transmitted by each node 102-1 to 102-N at the beginning of a TDMA slot. In another embodiment, a beacon is transmitted by only a subset of nodes 102-1 to 102-N at the beginning of a TDMA slot. If each node 102-1 to 102-N is properly following the communications schedule, transmission of a beacon by nodes 102-1 to 102-N should occur at the same point in time. As previously discussed, although the internal clocks for each node 102-1 to 102-N are nominally synchronized with each other, the synchronization is not perfect so that the clocks for each node 102-1 to 102-N are slightly skewed from each other. Accordingly, the beacons transmitted by each node 102-1 to 102-N are also slightly skewed from each other. However, knowing that all correctly operating nodes 102-1 to 102-N will maintain synchronization within a known tolerance of each other, it can be deduced that the beacon signals from all non faulty nodes 102-1 to 102-N will occur within a bounded time interval. This bounded time interval represents the underlying synchronization precision of the system, and may be calculated knowing the attributes of the clocks, e.g. drift rate etc, together with the properties of the fault tolerant clock synchronization algorithm executed by the protocol With embodiments of the present invention, central guardian 104 effectively synchronizes itself to the underlying system time base through parasitic time synchronization by observing the transmission of beacon signals from nodes 102-1 to 102-N. FIG. 3 is an illustration of one embodiment of clock synchronization for a network such as network 100 described with respect to FIG. 1. FIG. 3 includes a plurality of synchronization groups 320-1 to 320-R which are each comprised of a cluster of beacons 321-1 to 321-P received from nodes 102-1 to 102-N. Within an synchronization groups 320-1 to 320-R, beacons 321-1 to 321-P are received within a bounded interval of time π. As previously discussed, a bounded interval of time π represents the maximum skew that beacons 321-1 to 321-P received from properly operating nodes 102-1 to 102-N are expected to have. In one embodiment, network 100 is a TTP/C network and beacons 321-1 to 321-P are action time signals.

In order to synchronize with the underlying system time base (i.e. with the plurality of nodes 102-1 to 102-N), guardian 103 looks at one or more beacons received within a time interval t to determine whether the beacons represent a synchronization group 320-1 to 320-R, or whether the beacons were generated by a faulty node or network noise. In one embodiment, guardian 103 always looks for a second beacon 324 transmitted within t of a first beacon 322. When second beacon 324 is received within a time interval of t of first beacon 322, guardian 103 presumes the two beacons are part of a synchronization group 320-1 to 320-R such as synchronization group 320-2. When this occurs, guardian 103 begins counting a predefined time delay 330 starting from the time second beacon 324 is received. At the end of predefined time delay 330 guardian 103 opens a transmission window 328 for one node of nodes 102-1 to 102-N, which allows that node to transmit messages to network 100. FIG. 3 also illustrates a stray pulse 311 received outside the bounds of a synchronization group 320-1 to 320-R. Because there is no second pulse within t of pulse 311, guardian 103 considers pulse 311 as an outlier beacon not within a synchronization group 320-1 to 320-R, and thus a bad signal. Guardian 103 will not open a transmission window based on outlier pulse 311. In one embodiment, guardian 103 can identify which node 102-2 to 102-N generated pulse 311 and declare that node faulty. In one embodiment, beacons generated by a node declared faulty are subsequently ignored for purposes of synchronizing guardian 103 with network 100. In one embodiment, the time period t used by guardian 103 to validate the existence of a synchronization group 320-1 to 320-R is equal to the bounded interval time π which represents the maximum skew expected from non-outlier beacons.

In one embodiment, when guardian 103 opens a transmission window 328 for one node of nodes 102-1 to 102-N, which node is determined by the guardian's knowledge of the slot sequence dictated by the underlying network protocol. In one embodiment, the underlying network protocol is a TDMA protocol and the guardian increments TDMA schedule position based on the receipt of the cluster of beacons. In one embodiment, the underlying network protocol uses time triggered protocol (TTP). In other embodiments, guardian 103 has no knowledge of the slot sequence dictated by the underlying network protocol. In one such embodiment, when guardian 103 opens a transmission window 328 for one node of nodes 102-1 to 102-N, which node is permitted to transmit is determined by priority based arbitration as detailed in the '5459 application herein incorporated by reference. In another such embodiment, each beacon may carry information so that when guardian 103 opens a transmission window 328 for one node of nodes 102-1 to 102-N, which node is permitted to transmit is determined by a voting mechanism for transmission schedule enforcement as detailed in the '5065 application herein incorporated by reference. In one embodiment beacons carry schedule knowledge messages as detailed in the '5065 application.

In one embodiment the plurality of synchronization groups 320-1 to 320-R define an independent time basis for guardian 103 which can be utilized by guardian 103 to implement other network processes or guard against system faults. For example, Patent No. U.S. 2004/0030949 (Kopetz et al.) describes methods of dealing with SOS ("slightly off specification") faults. In one embodiment of the present invention, synchronization groups 320-1 to 320R provide the independent time bases for a central guardian, such as the central guardians described in Kopetz to implement the methods of that invention.

In one embodiment, a double fault tolerant system is implemented which tolerates two outlier beacons such as pulses 313 and 314. Upon receipt of a first beacon 322, guardian 103 looks for the transmission of a second beacon 324 and a third beacon 326 within the time interval of t of first beacon 322. When third beacon 326 is received within time interval of t of first beacon 322, guardian 103 presumes the three beacons are part of a synchronization group 320-1 to 320-R such as synchronization group 320-2. When this occurs, guardian 103 begins counting predefined time delay 335 starting from the time third beacon 326 is received. At the end of predefined time delay 335 guardian 103 opens transmission window 340 for one node of nodes 102-1 to 102-N, which allows that node to transmit messages to network 100. FIG. 3 further illustrates stray pulses 313 and 314 received outside the bounds of a synchronization group 320-1 to 320-R. Because there is no third pulse within t of pulses 313 and 314, guardian 103 considers pulses 313 and 314 as outliers not within a synchronization group 320-1 to 320-R, and thus bad signals. Guardian 103 will not open a transmission window based on outlier pulses 313 and 314. In one embodiment, guardian 103 can identify which nodes 102-2 to 102-N generated pulse 313 and 314 and declare those nodes faulty. In one embodiment, beacons generated by nodes declared faulty are subsequently ignored for purposes of synchronizing guardian 103 with network 100.

Figure 2:
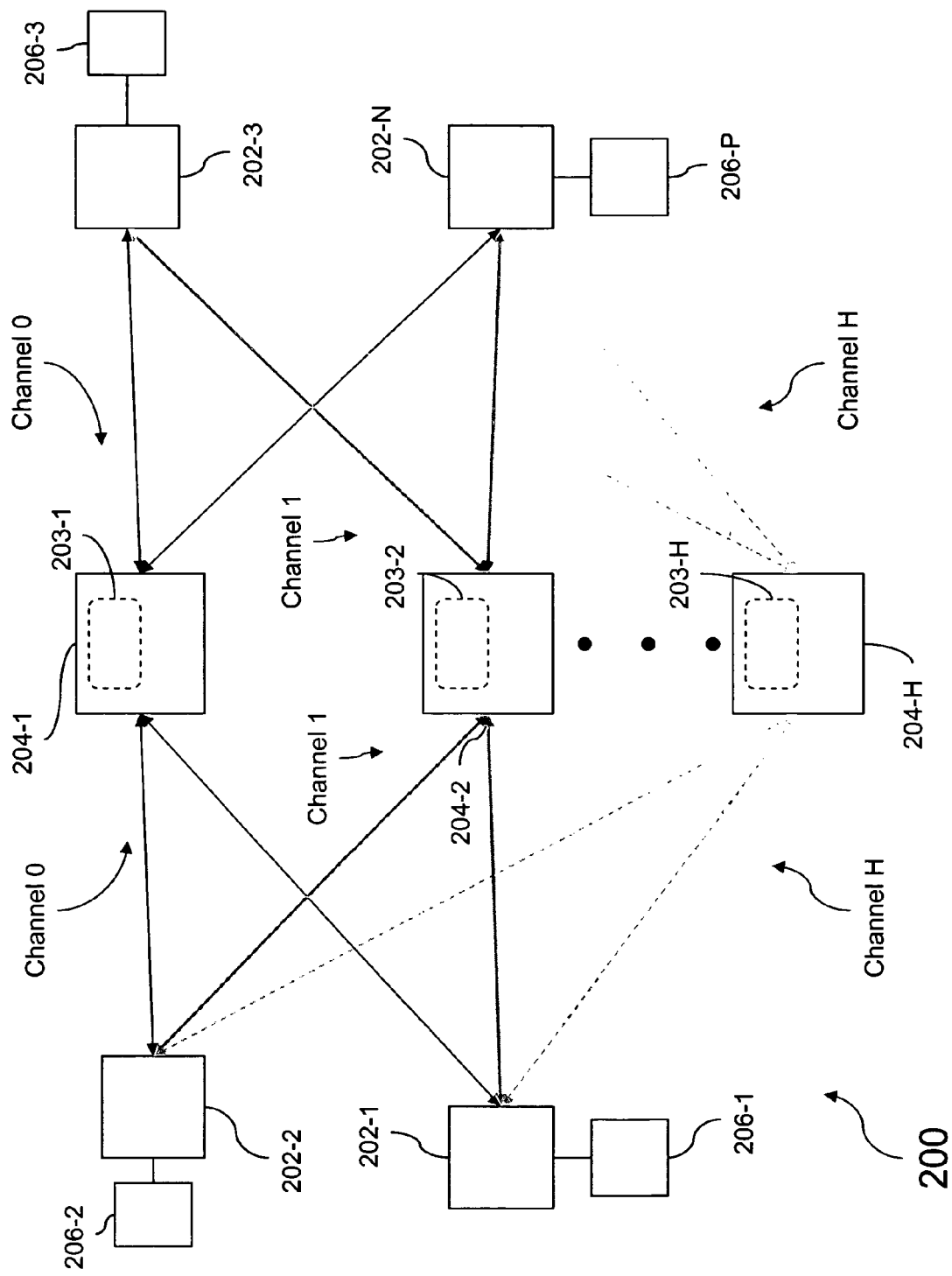
FIG. 2 is a block diagram of another embodiment of multi-hub network according to the teachings of the present invention.

In other embodiments, guardian 103 may wait until receipt of a fourth beacon, or a fifth beacon, or any number of beacons up to N before it presumes that the beacons constitute a synchronization group 320-1 to 320-R FIG. 2 is a block diagram of one embodiment of a multiple hub based network, shown generally at 200, according to the teachings of the present invention. In this embodiment, network 200 includes a plurality of nodes 202-1 to 202-N each coupled to a plurality of hubs 204-1 to 204-H. In one embodiment, each subnetwork comprising communication links between an individual hub and the plurality of nodes 202-1 to 202-N defines a single network channel (0, 1, to H) that operates on the same basis as the single hub network 100 described in the embodiments of FIG. 1 and FIG. 3. In one embodiment, one or more electronic devices 206-1 to 206-P are connected to nodes 202-1 to 202-N. In one embodiment, electronic devices 206-1 to 206-P include sensors, processors, actuators, controllers, input devices and the like that communicate data frames over network 200.

Data is transmitted in frames from one node 202-1 to 202-N to another in network 200 through hubs 204-1 to 204-N. As described in for network 100 of FIG. 1, in one embodiment, network 200 operates on a time division multiple access (TDMA) based communication protocol where each node 202-1 to 202-N has been assigned a transmission slot order (i.e. a TDMA slot) within the channel. Hubs 204-1 to 204-3 each includes a central guardian 203-1 to 203-H that ensures that a degraded node 202-1 to 202-N transmitter cannot broadcast messages on an associated network channel outside the allotted window. For each channel in network 200, the associated guardian 203-1 to 203-H is synchronized with network 200 through beacons transmitted by nodes 202-1 to 202-N, and opens transmission windows for nodes as described in FIG. 3.

Figure 4:
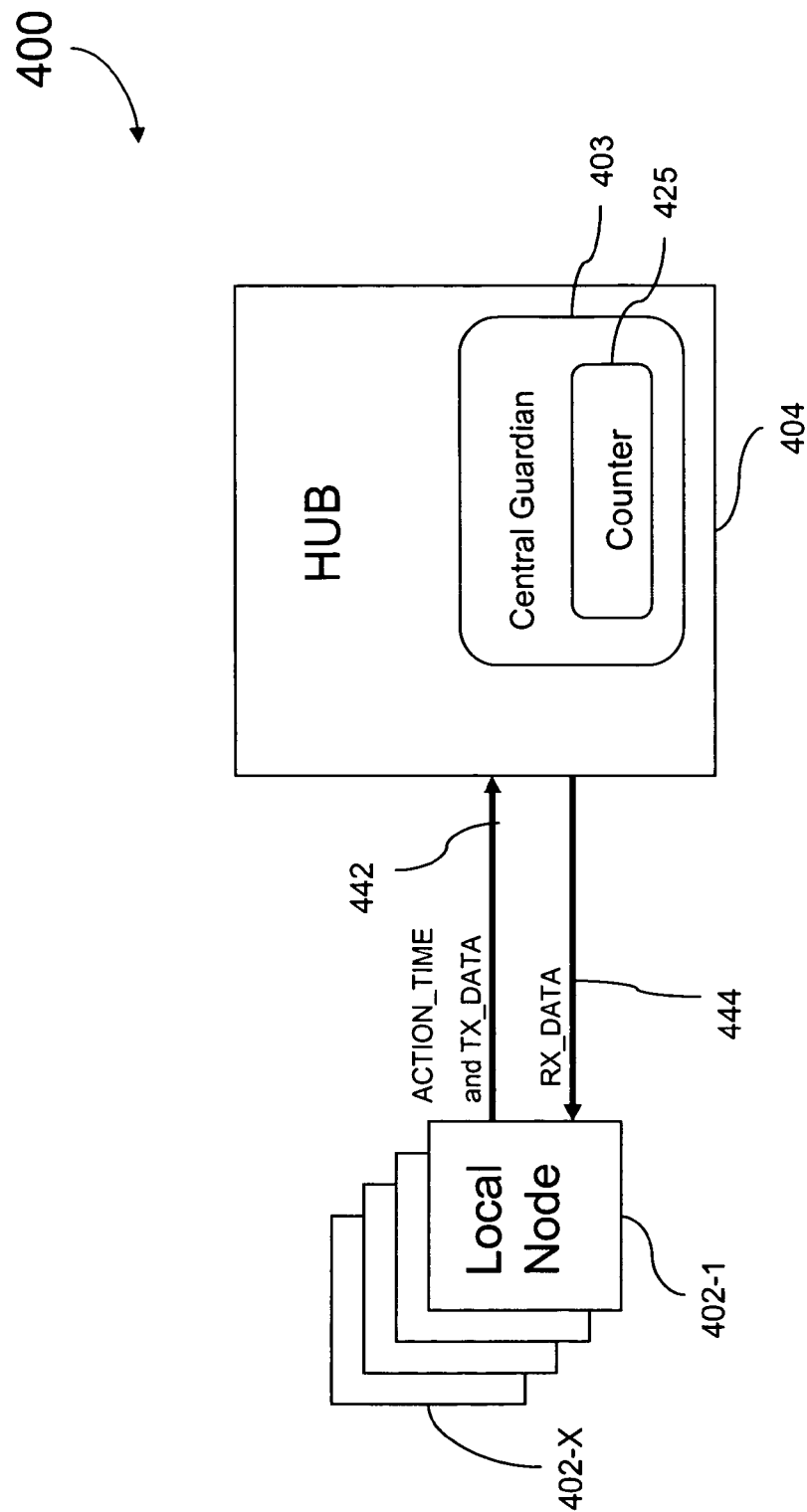
FIG. 4 is a block diagram of one embodiment of a portion of a network representing a single channel of network 200 described with respect to FIG. 2 of the present invention.

FIG. 4 is a block diagram of one embodiment of a single channel of a network 400, such as network 200 described with respect to FIG. 2 and FIG. 3 above. A hub 404 includes a centralized guardian 403. Centralized guardian 403 includes a counter 425 to determine whether two or more pulses are received by guardian 403 within the time interval t, in order to carry out guardian 403 synchronization as described with respect to FIG. 3 above. In one embodiment, hub 404 utilizes dedicated lines from each node 402-1 to 404-X to receive synchronization beacons, and separate lines to from each node 402-1 to 404-X to receive data signal transmissions. In another embodiment, for each channel, the beacon signal is multiplexed onto the line which carries the data signal allowing for a combined line 442 between each node 402-1 to 404-X and hub 404. In this embodiment, the synchronization described above includes nodes 402-1 to 402-X sending beacons to guardian 403 on their associated combined line 442 indicating when each node believes a new TDMA slot starts. In one embodiment, each node 402-1 to 402-X is adapted begin transmission of data signals only after a predefined time delay after its TDMA slot starts, so that a beacon signal and a data signal from the same node will not collide. This allows the synchronization of the present invention to be utilized without any additional wiring overhead. Combined line 442 has a further advantage over two dedicated lines because hub 404 is no longer required to monitor two separates lines for node 402-1 to 402-X. In embodiments where beacon signals and data signals are multiplexed, centralized guardian 403 has a priori knowledge of slot lengths.

As described with respect to FIG. 3, in one embodiment, counter 425 begins counting upon receipt of a beacon signal from a node 402-1 to 402-X. When a second beacon signal is received from another node 402-1 to 402-X before t elapses on counter 425, guardian 403 presumes the beacons represent a synchronization group 320-1 to 320-R and after a predetermined delay after the second beacon is received, opens a transmission window 328 for one node, such as node 402-1, which allows node 402-1 to transmit messages on the channel associated with hub 404. While transmission windows 328 is open for node 402-1, each of the other nodes of nodes 402-1 to 402-X listen to the data signal transmitted by node 402-1 via their associated receiving line 444. In another embodiment, guardian 403 opens a transmission window 328 for node 402-1 after predetermined delay 330 after the nth beacon is received wherein n is $\geq 2$.

In addition to the advantages described above, using the parasitic time synchronization of the present invention reduces the affect that individual node clock drifts have on the synchronization of guardian windows and the transmission of data across the network as a whole. Further, parasitic time synchronization contributes in keeping hubs in multi-hub networks independent for network fault analysis purposes because each hub is synchronized by the nodes of its associated channel and not through links between two or more hubs in the network. As a result, the synchronization of guardians is simpler and supports independence between the Hubs.

In yet another embodiment, the receipt of beacon clusters by a central guardian, such as guardians described in the figures above, can be used by the central guardian to determine operational mode of the network, such as whether the network is in synchronous operation.

Figure 5:
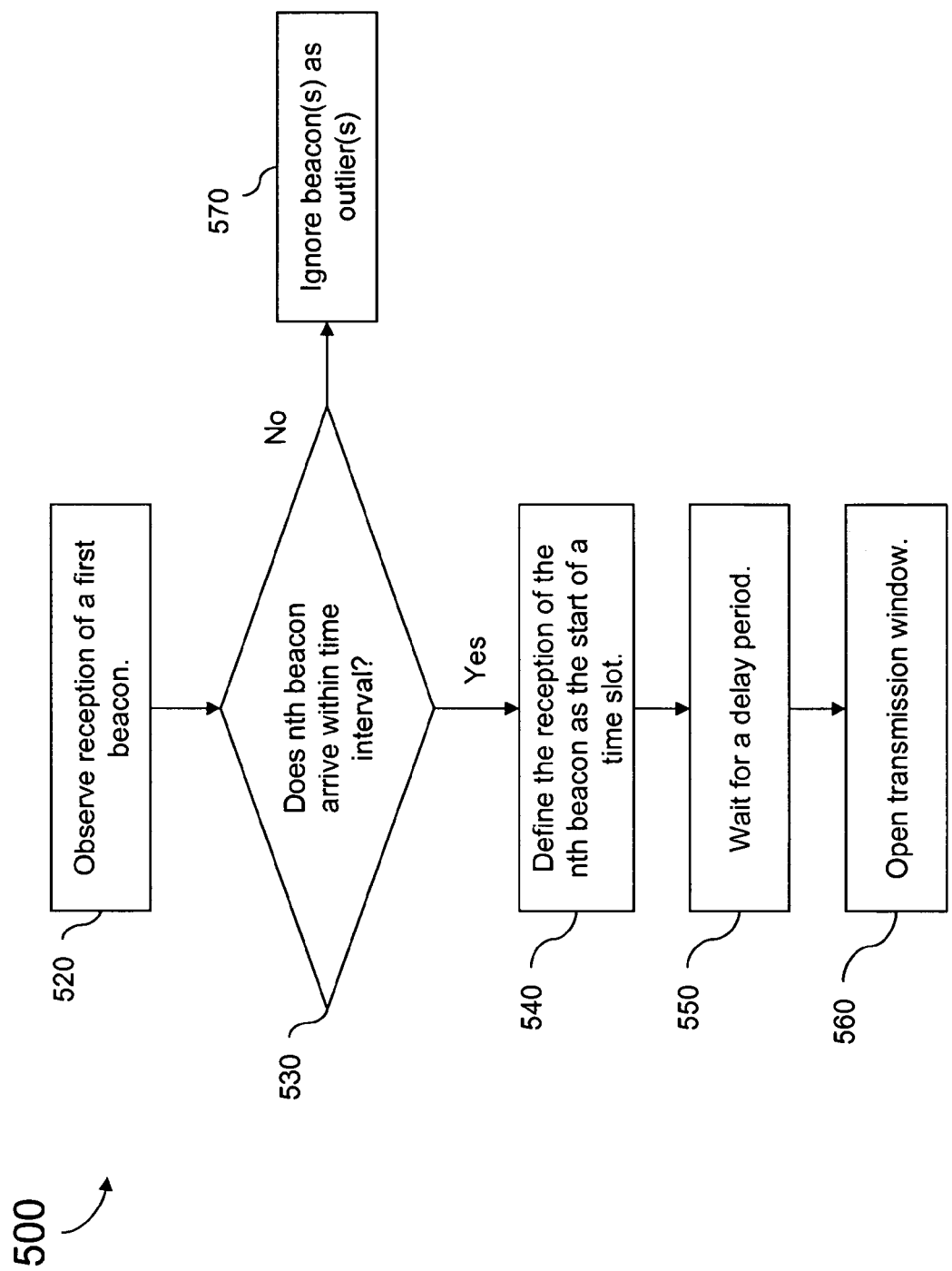
FIG. 5 is a block diagram of a method of one embodiment of the present invention.

In FIG. 5, a method for synchronizing a centralized guardian with a plurality of nodes of a network 500, of one embodiment of the present invention is provided. The method comprises observing the receipt of a first beacon (520) and observing the receipt of an nth beacon within a predefined time interval t (530), wherein n is greater than or equal to two. When the receipt of an nth beacon occurs within the predefined time interval t, the method further comprises defining the receipt of the nth beacon as the beginning of a time slot (540). In one embodiment, the method continues with waiting a delay period after the beginning of the time slot (550) and opening a transmission window for one node of the plurality of nodes (560). When the receipt of an nth beacon does not occur within the predefined time interval t, the one or more beacons received are ignored as outliers (570).

Several ways are available to implement the synchronizing a centralized guardian of the current invention. These include, but are not limited to, digital computer systems, programmable controllers, or field programmable gate arrays. Therefore other embodiments of the present invention are program instructions resident on computer readable media which when implemented by such networks enable the centralized guardian to implement embodiments of the present invention. Computer readable media include any form of computer memory, including but not limited to magnetic disk or tape, CD-ROMs, DVD-ROMs, or any optical data storage system, flash ROM, non-volatile ROM, or RAM.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A parasitic time synchronization network, the network comprising:
   a plurality of nodes, wherein each node is adapted to transmit and receive data;
   one or more hubs, each hub having communication links with the plurality of nodes;
   wherein each node is adapted to communicate with every other node through the one or more hubs;
   wherein the communication links between any one hub and the plurality of nodes defines a communication channel; and
   one or more guardians, wherein each guardian is associated with one communication channel;
   wherein each node is assigned a time slot in which it is permitted to transmit data through an associated hub of the one or more hubs;
   wherein a guardian of an associated channel blocks propagation of data transmissions between the plurality of nodes through the associated hub and allows only data transmissions from one of the plurality of nodes;
   wherein the guardian periodically receives a cluster of beacons generated by a plurality of the plurality of nodes;
   wherein the guardian is further adapted to observe receipt of a first beacon,
   wherein when the guardian observes receipt of an nth beacon within a predefined time interval t then the guardian concludes that the first beacon, the nth beacon, and any beacons received between the first and nth beacons comprise a cluster of beacons indicating the beginning of a time slot, wherein n is greater than or equal to two.

2. The network of claim 1, wherein the guardian is adapted to know when the beginning of a time slot occurs by observing the cluster of beacons.

3. The network of claim 2, wherein the guardian is adapted to distinguish between the cluster of beacons and one or more outlier beacons generated by one or more degraded nodes.

4. The network of claim 1, wherein the network is a TDMA network and the time slot is a TDMA slot.

5. The network of claim 1, wherein the network is a TTP/C protocol network and the beacons are action time signals.

6. The network of claim 1, wherein each guardian is located within an associated hub.

7. The network of claim 6, wherein each node transmits beacons and data on the same communication link.

8. The network of claim 1, wherein upon identifying the cluster of beacons indicating the beginning of a time slot, and after a predefined time delay, the guardian opens a transmission window, wherein the transmission window allows the propagation of data transmissions from one of the plurality of nodes.

9. The network of claim 8, wherein the one of the plurality of nodes allowed to propagate data transmission is the node authorized to transmit by the network protocol.

10. The network of claim 9, wherein the guardian increments TDMA schedule position based on the receipt of the cluster of beacons.

11. The network of claim 8, wherein the one of the plurality of nodes allowed to propagate data transmission is determined by priority based arbitration.

12. The network of claim 11, wherein the guardian starts the timing of a priority arbitration window based on the receipt of the cluster of beacons.

13. The network of claim 8, wherein the one of the plurality of nodes allowed to propagate data transmission is determined by a voting mechanism for transmission schedule enforcement.

14. The network of claim 8, wherein the predefined time delay begins on the receipt of the nth beacon of the cluster of beacons.

15. The network of claim 1, wherein the guardian periodically receiving the cluster of beacons generated by the plurality of the plurality of nodes define an independent time basis for the guardian to implement other network processes.

16. The network of claim 1, wherein the guardian periodically receiving the cluster of beacons generated by the plurality of the plurality of nodes define an independent time basis for the guardian to guard against system faults.

17. The network of claim 1, wherein the guardian detects the operating mode of the network by periodically receiving the cluster of beacons generated by the plurality of the plurality of nodes.

18. The network of claim 1, further comprising:
   one or more electronic devices in communication with the plurality of nodes, wherein the electronic devices include one or more of sensors, processors, actuators, controllers, and input devices.

19. A network, comprising:
   one or more hubs;
   a plurality of nodes, wherein each node is adapted to communicate with every other node through the one or more hubs;
   a synchronization function enabled within network, including:
   a central guardian; and
   a plurality of clusters of beacons transmitted to the central guardian by a plurality of the plurality of nodes, wherein based on receipt of one of the plurality of clusters of beacons the central guardian opens a transmission window for one of the plurality of nodes and allows data transmissions from the one of the plurality of nodes to propagate to other nodes and blocks any transmissions from the others node during the transmission window;

wherein the central guardian distinguishes between the one of the plurality of clusters of beacons and the one or more outlier beacons by observing receipt of a first beacon, and when the guardian observes receipt of an nth beacon within a predefined time interval t, then the guardian concludes that the first beacon, the nth beacon, and any beacons received between the first and nth beacons comprise one cluster of beacons, wherein n is greater than or equal to two.

20. The network of claim 19, wherein the central guardian is adapted to distinguish between each of the plurality of clusters of beacons and one or more outlier beacons.

21. The network of claim 20, wherein upon identifying one cluster of beacons, and after a predefined time delay, the guardian opens a transmission window, wherein the transmission window allows the propagation of data transmissions from one of the plurality of nodes.

22. The network of claim 21, wherein the transmission window allows the propagation of data transmissions from one of the plurality of nodes only when the one of the plurality of nodes is transmitting during its assigned TDMA slot.

23. The network of claim 22, wherein the central guardian increments TDMA schedule position based on the receipt of the one cluster of beacons.

24. The network of claim 21, wherein the one of the plurality of nodes allowed to propagate data transmission is determined by priority based arbitration.

25. The network of claim 24, wherein the guardian starts the timing of a priority arbitration window based on the receipt of the one cluster of beacons.

26. The network of claim 21, wherein the one of the plurality of nodes allowed to propagate data transmission is determined by a voting mechanism for transmission schedule enforcement.

27. The network of claim 26, wherein the predefined time delay begins on the receipt of the nth beacon of the one cluster of beacons.

28. The network of claim 19, wherein the network is a TDMA protocol network and the time slot is a TDMA slot.

29. The network of claim 28, wherein the network is a TTP/C protocol network and the beacons are action time signals.

30. The network of claim 19, wherein the guardian periodically receiving the cluster of beacons generated by the plurality of the plurality of nodes define an independent time basis for the guardian.

31. A method for synchronizing a centralized guardian in a hub with a plurality of nodes of a network, the method comprising:

observing, with the centralized guardian, receipt of a first beacon;

observing, with the centralized guardian, receipt of an nth beacon within a predefined time interval t, wherein n is greater than or equal to two;

concluding, with the centralized guardian, that the first beacon, the nth beacon and any beacons observed between the first and nth beacon comprises a cluster of beacons; and when the receipt of the nth beacon occurs within the predefined time interval t, defining, with the centralized guardian, the receipt of the nth beacon as the beginning of a time slot.

32. The method of claim 31, further comprising:

waiting a delay period after the beginning of the time slot; and opening a transmission window for one node of the plurality of nodes.

33. A parasitic time synchronization network, comprising:

means for synchronizing a centralized guardian with a plurality of nodes of a network:

means for observing receipt of a first beacon;

means for observing receipt of an nth beacon within a predefined time interval t, wherein n is greater than or equal to two;

means for concluding that the first beacon, the nth beacon and any beacons observed between the first and nth beacon comprises a cluster of beacons; and when the receipt of the nth beacon occurs within the predefined time interval t, defining the receipt the nth beacon as the beginning of a time slot.

34. The network of claim 33, further comprising:

means for waiting a delay period after the beginning of the time slot; and means for opening a transmission window for one node of the plurality of nodes.

35. A computer-readable medium having computer-executable instructions for performing a method of synchronizing a centralized guardian with a plurality of nodes of a network, the method comprising:

observing receipt of a first beacon;

observing receipt of an nth beacon within a predefined time interval t, wherein n is greater than or equal to two;

concluding that the first beacon, the nth beacon and any beacons observed between the first and nth beacon comprises a cluster of beacons; and when the receipt of the nth beacon occurs within the predefined time interval t, defining the receipt of the nth beacon as the beginning of a time slot.

36. The method of claim 35, further comprising:

waiting a delay period after the beginning of the time slot; and opening a transmission window for one node of the plurality of nodes.

* * * * *